(12) United States Patent
Lacaze et al.

(10) Patent No.: US 11,644,843 B2
(45) Date of Patent: May 9, 2023

(54) LEARNING MECHANISM FOR AUTONOMOUS TRUCKS FOR MINING AND CONSTRUCTION APPLICATIONS

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: ROBOTIC RESEARCH OPCO, LLC, Clarksburg, MD (US)

(*) Notice: Subject to any disclaimer, the term of this patent is extended or adjusted under 35 U.S.C. 154(b) by 80 days.

(21) Appl. No.: 16/679,376

(22) Filed: Nov. 11, 2019

(65) Prior Publication Data

US 2020/0225675 A1 Jul. 16, 2020

Related U.S. Application Data

(60) Provisional application No. 62/759,956, filed on Nov. 12, 2018.

(51) Int. Cl.
  *G05D 1/02* (2020.01)
  *G05D 1/00* (2006.01)

(52) U.S. Cl.
  CPC ......... *G05D 1/0219* (2013.01); *G05D 1/0088* (2013.01); *G05D 1/027* (2013.01);
  (Continued)

(58) Field of Classification Search
  CPC .. G05D 1/0219; G05D 1/0088; G05D 1/0214; G05D 1/027; G05D 1/0274; G05D 1/0278; G05D 1/0285; G05D 2201/0202
  See application file for complete search history.

(56) References Cited

U.S. PATENT DOCUMENTS 5,555,503 A * 9/1996 Kyrtsos ................. G05D 1/028
  701/518
6,044,312 A 3/2000 Sudo et al.
  (Continued)

FOREIGN PATENT DOCUMENTS

| CN | 106627456 A | 5/2017 |
| JP | H08-263138 A | 10/1996 |
| WO | 2017180430 A1 | 10/2017 |

OTHER PUBLICATIONS

Office Action, dated Apr. 28, 2021, in U.S. Appl. No. 16/445,751. (21 pages).
(Continued)

*Primary Examiner* — Anshul Sood
(74) *Attorney, Agent, or Firm* — RowanTree Law Group, PLLC; Frederick F. Rosenberger

(57) ABSTRACT

The invention simplifies the process of utilizing mmmg or construction trucks to automatically carry ore, dirt, or other matter from one location to another. Transportation of the dirt, ore, or matter is usually performed using trucks with loaders or excavators. The trucks then take the loads and deposit them in piles, which are then used for the next step of the mining or construction process. The invention uses a teach-and-follow process to establish the trajectories that these paths must follow. The present invention describes a system to record and execute trajectories for autonomous mining and construction trucks. This system comprises one or more sensors that can detect road features, a drive-by-wire kit installed onto the truck(s), a user interface that allows the operator to learn trajectories and "replay trajectories", and a planning algorithm that creates trajectories which take the vehicle from a starting location to an ending location (final destination), while maintaining the vehicle inside of the allowed driving envelope. The invention allows the user to drive the truck along the desired route and have (Continued)

the truck automatically learn the route using features in the environment to localize. In future runs, the truck is able to automatically follow the learned route.

20 Claims, 2 Drawing Sheets

(52) U.S. Cl.
CPC ......... *G05D 1/0214* (2013.01); *G05D 1/0274* (2013.01); *G05D 1/0278* (2013.01); *G05D 1/0285* (2013.01); *G05D 2201/0202* (2013.01)

(56) References Cited

U.S. PATENT DOCUMENTS

| | | | |
|---|---|---|---|
| 6,341,372 | B1 | 1/2002 | Datig |
| 9,383,754 | B2 | 7/2016 | Takeda |
| 9,925,662 | B1* | 3/2018 | Jules ................... G05B 19/423 |
| 10,048,692 | B2 | 8/2018 | Hamada et al. |
| 10,071,893 | B2 | 9/2018 | High et al. |
| 10,802,503 | B2 | 10/2020 | Minagawa et al. |
| 2004/0158355 | A1 | 8/2004 | Holmqvist et al. |
| 2008/0021632 | A1* | 1/2008 | Amano ................. G01C 21/26 701/117 |
| 2009/0076674 | A1 | 3/2009 | Kiegerl et al. |
| 2011/0029238 | A1* | 2/2011 | Lee ................... G01C 21/3484 701/414 |
| 2012/0092486 | A1 | 4/2012 | McDaniel et al. |
| 2012/0136509 | A1 | 5/2012 | Everett et al. |
| 2012/0136524 | A1 | 5/2012 | Everett et al. |
| 2013/0173109 | A1 | 7/2013 | Hukkeri et al. |
| 2013/0261870 | A1 | 10/2013 | Halder et al. |
| 2013/0325208 | A1 | 12/2013 | Dsagawa et al. |
| 2014/0309841 | A1* | 10/2014 | Hara ................... G05D 1/0274 701/26 |
| 2014/0371947 | A1 | 12/2014 | Stratton et al. |
| 2015/0057871 | A1* | 2/2015 | Ono ................... G01C 21/32 701/23 |
| 2015/0285650 | A1* | 10/2015 | Lewis ................. G01C 21/3407 701/428 |
| 2016/0040397 | A1 | 2/2016 | Kontz |
| 2016/0271795 | A1* | 9/2016 | Vicenti ............... G05D 1/0274 |
| 2016/0314224 | A1 | 10/2016 | Wei et al. |
| 2016/0349754 | A1* | 12/2016 | Mohr ..................... B66F 9/063 |
| 2016/0379152 | A1 | 12/2016 | Rodoni |
| 2017/0247033 | A1 | 8/2017 | Vandapel |
| 2017/0253237 | A1* | 9/2017 | Diessner ............... B60W 50/14 |
| 2017/0285655 | A1 | 10/2017 | Katou et al. |
| 2017/0314955 | A1* | 11/2017 | Lynn ..................... G06F 16/29 |
| 2017/0315515 | A1 | 11/2017 | Vandapel et al. |
| 2018/0004224 | A1* | 1/2018 | Arndt ................. G05D 1/0221 |
| 2018/0016124 | A1 | 1/2018 | Keller |
| 2018/0044888 | A1 | 2/2018 | Chi et al. |
| 2019/0033877 | A1 | 1/2019 | Wei |
| 2019/0072953 | A1 | 3/2019 | Maheshwari et al. |
| 2019/0073762 | A1 | 3/2019 | Kean |
| 2019/0113919 | A1 | 4/2019 | Englard et al. |
| 2019/0212745 | A1* | 7/2019 | Wendt ................... G01C 21/20 |
| 2019/0279508 | A1 | 9/2019 | Wang |
| 2019/0286148 | A1 | 9/2019 | Hase et al. |
| 2019/0302794 | A1 | 10/2019 | Kean et al. |
| 2020/0033847 | A1 | 1/2020 | Way et al. |
| 2020/0050192 | A1 | 2/2020 | O'Donnell et al. |
| 2020/0117201 | A1* | 4/2020 | Oetken ................. G06K 9/0063 |
| 2020/0150656 | A1 | 5/2020 | Lacaze et al. |
| 2020/0150668 | A1 | 5/2020 | Lacaze et al. |
| 2020/0150687 | A1 | 5/2020 | Halder et al. |
| 2020/0174486 | A1 | 6/2020 | Luo et al. |
| 2020/0180924 | A1 | 6/2020 | Lacaze et al. |
| 2020/0344622 | A1 | 10/2020 | Campbell, Jr. et al. |
| 2020/0362541 | A1 | 11/2020 | Takaoka |
| 2020/0384987 | A1* | 12/2020 | Preissler ............... G05D 1/0274 |
| 2020/0394813 | A1 | 12/2020 | Theverapperuma et al. |
| 2020/0401134 | A1 | 12/2020 | Lacaze et al. |
| 2021/0064050 | A1 | 3/2021 | Pickett et al. |
| 2021/0124359 | A1 | 4/2021 | Wei |
| 2021/0141372 | A1 | 5/2021 | Lacaze et al. |
| 2022/0253062 | A1 | 8/2022 | Gan |
| 2022/0356674 | A1 | 11/2022 | Norfleet et al. |

OTHER PUBLICATIONS

Office Action, dated Jul. 19, 2021, in U.S. Appl. No. 16/676,666. (23 pages).
Office Action, dated Jul. 30, 2021, in U.S. Appl. No. 16/676,544. (21 pages).
Office Action, dated Jun. 24, 2021, in U.S. Appl. No. 16/601,775. (30 pages).

* cited by examiner

LEARNING MECHANISM FOR AUTONOMOUS TRUCKS FOR MINING AND CONSTRUCTION APPLICATIONS

CROSS REFERENCE TO RELATED PATENT APPLICATIONS

The application claims priority from U.S. Patent Application Ser. 62/759,956, entitled "Learning Mechanism for Autonomous Trucks for Mining and Construction Applications", filed on 12 Nov. 2018. The benefit under 35 USC § 119(e) of the United States provisional application is hereby claimed, and the aforementioned application is hereby incorporated herein by reference.

STATEMENT REGARDING FEDERAL SPONSORSHIP

No part of this invention was a result of any federally sponsored research.

TECHNICAL FIELD OF THE INVENTION

The present invention relates in general to autonomous systems, and, more specifically, to a learning mechanism for autonomous trucks for mining and construction applications.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Easily accessible mining locations are being systematically exhausted; as a result, mining companies are venturing into areas where mining is more difficult, and ore less rich. These locational shifts are constantly affecting the profitability and productivity of the mines. Of the many financial burdens associated with these locations, the two most important may be the mining companies' safety and labor cost.

Autonomous trucks can help alleviate these burdens, allowing companies to mine areas that are considered too unsafe for human performance, possibly changing the cost of labor.

The invention simplifies the process of utilizing mining or construction trucks to automatically carry ore, dirt, or other matter from one location to another. Transportation of the dirt, ore, or matter is usually performed using trucks with loaders or excavators. The trucks then take the loads and deposit them in piles, which are then used for the next step of the mining or construction process. The invention uses a teach-and-follow process to establish the trajectories that these paths must follow.

BRIEF SUMMARY OF THE INVENTION

To minimize the limitations in the prior art, and to minimize other limitations that will be apparent upon reading and understanding the present specification, the present invention describes a learning mechanism for autonomous trucks for mining and construction applications.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Figure 1:
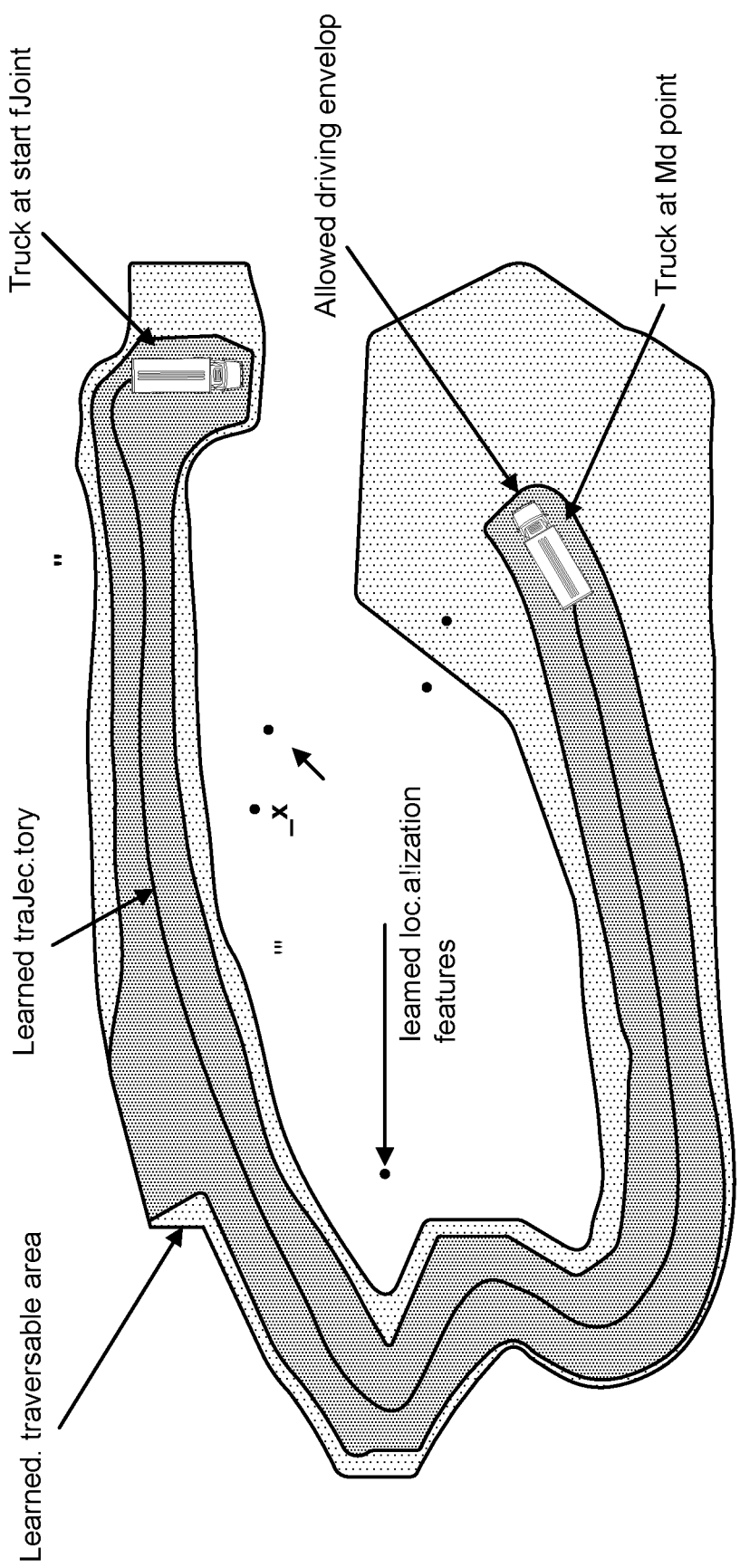
FIG. 1 illustrates an overview of a learning mechanism for autonomous trucks for mining and construction applications, as contemplated by the present disclosure in which the learned localization features are indicated along the learned traversable area, learned trajectory, Also, the truck at the start point and at the end point is indicated.
Figure 2:
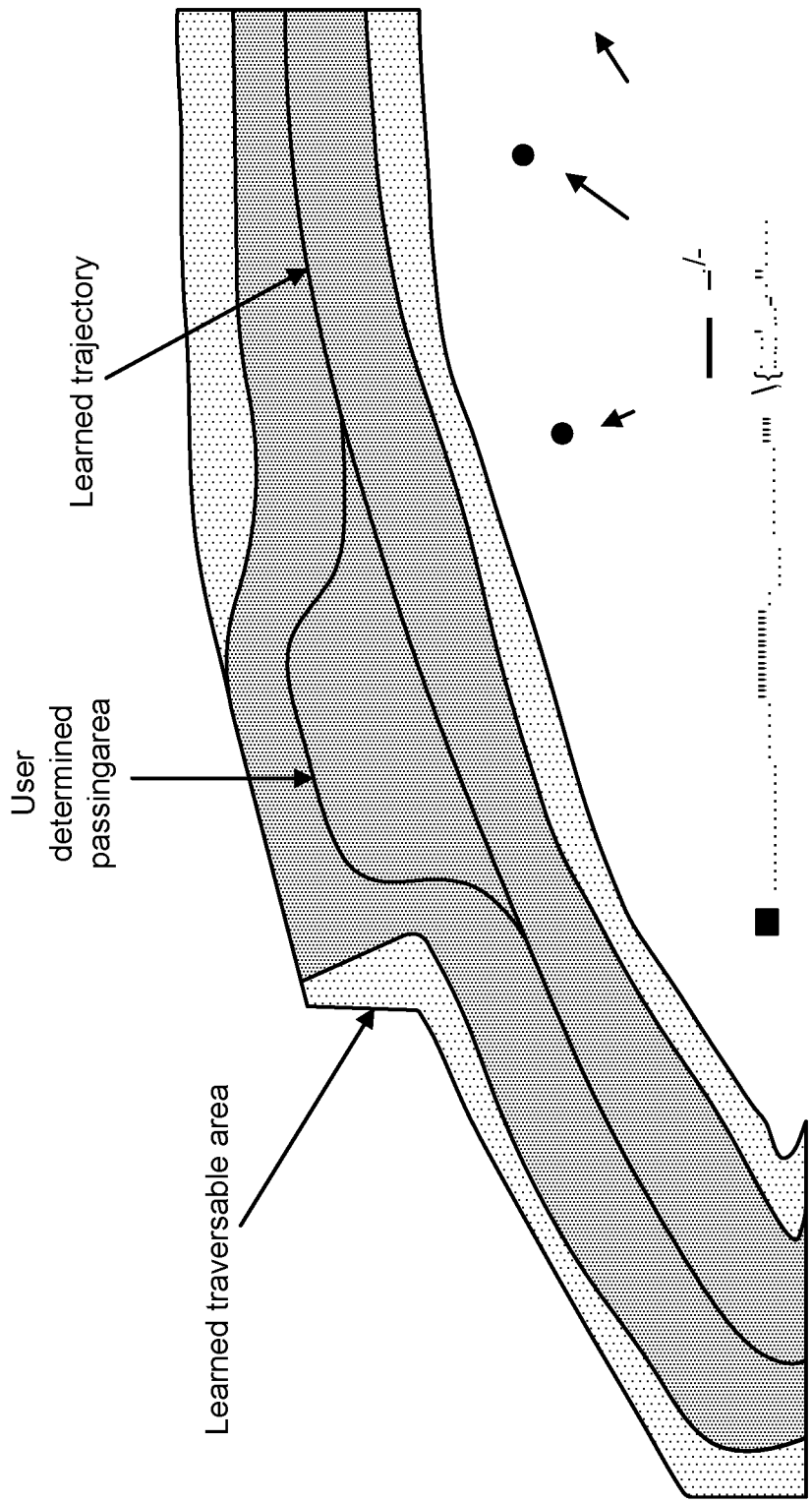
FIG. 2 illustrates an overview of a learning mechanism for autonomous trucks for mining and construction applications, as contemplated by the present disclosure in which a learned traversable area is indicated as well as a user determined passing area and a learned trajectory.

Roads used during construction and mmmg operations are usually built for temporary use. As the mine develops or the construction site changes, the trucks' routes change accordingly. However, once a route if established, it is not uncommon for the trucks to follow the same route hundreds or thousands of times. When considering route planning, the trajectories that the trucks must follow is not only determined by the terrain or traversability; on the contrary, a mine operator may want the trucks to follow certain paths due to safety, dust generation, or traffic control. In other words, the trucks cannot determine the paths automatically just by sensing the terrain—they must be supplied with information about areas where they should not attempt to go, even if the terrain is sound and traversable. It is this exchange of information that the invention simplifies in a variety of ways:

The operator can teach the truck the trajectory. This can be accomplished by driving or teleoperating the truck along the desired trajectory. The invention collects the location information of this trajectory. The collection process is important, since errors in localization will cause the truck to deviate from the desired path. In mining and construction applications, it is not always possible to use GPS, as the satellites may be occluded or partially occluded by buildings, or the mine overburdened by vegetation. The invention can use beacons in the infrastructure to localize; however, this is generally impractical for many uses. Some mines are very large, to the point where adding this level of infrastructure is too cumbersome or expensive. Therefore, the invention can use color, texture, and morphological features along the trajectory to localize and learn the trajectory. These natural occurring features are sufficient to record and localize the replay of the trajectories.

The operator can indicate the desired trajectories from a geo-registered map, or by submitting a list of geo-registered points. The operator can also indicate the maximum deviation from these trajectories in the form of a single or a set of separation distances, or a geo-registered envelope or manifold.

The operator can indicate, in the form of a geo-registered envelope or manifold, the areas where passing traffic is allowed; or, where waiting for traffic to pass is necessary. Many mining or construction roads are too narrow to allow two trucks to drive in opposite directions. It may be necessary to wait until a truck from the oncoming direction has passed through before proceeding. This interface in the invention allows the mine operator to set up these passing areas.

In the preferred mode of operation, when a new autonomous truck route is being added to the road network, the following steps are facilitated by the invention:

During the learning phase:

A driver starts "recording" or learning the route at the beginning of the route.

The driver drives the route until reaching the final destination.

The invention, using its localization system, records tightly sampled poses of the truck.

The invention records features along the route that can be used for localization.

The invention records traversable areas along the route.

Once the driver reaches the final destination, the operator stops recording.

The invention provides a map of the route, and traversable areas along the path.

The operator, using a user interface, selects a route tolerance within the traversable areas.

The operator, using a user interface, selects areas where truck passing are allowed.

During the execution phase:

The autonomous truck is at the starting location of the trajectory.

An operator selects a trajectory and associates the trajectory to the truck.

The truck starts following the recorded trajectory and maintains the truck within the tolerances provided during the learning phase.

The truck uses the pre-recorded features to localize (in conjunction with GPS or localization beacons, if available).

The truck optimizes the trajectory within the side tolerances provided during the learning phase as to avoid debris, vegetation, pedestrians, and other obstacles.

At the end of the trajectory, the truck automatically stops and goes into a stand-by mode, awaiting new instructions.

The invention is composed of three main modules:

A perception system that uses a combination of cameras, stereo pairs, LADAR, and/or ranging sensors that collects imagery in the areas where the truck will traverse. The perception system also has a navigation unit. The navigation unit may include GPS, inertial components, ranging radios, and/or wheel encoders. The perception system:

Processes the information collected by the sensors to create a support surface estimation. This support surface is an estimate of the location where the wheel-soil interaction will occur.

The perception system also finds the location of features on the trajectory, which are then used to localize the vehicle in future runs.

The perception system determines the areas of the road that are traversable and presents these areas to the operator so that he/she can choose the allowed driving envelope.

Finally, the perception system finds all obstacles that can harm the vehicle and sends these obstacles to the planning system.

A world model system that stores and collects this information over the complete trajectory. This world model can be shared by different trucks using a radio, or physically shared. The information collected includes support surface estimation, the allowed driving envelope, as well as obstacles and localization features A behavior generation module. The behavior generation module creates obstacle-free trajectories that take the vehicle from the starting location to the final location. The behavior generator uses the information supplied by the world model.

An interface that allows an operator to:

Record the trajectory to be followed;

Add and modify passing areas to the trajectory, either by manual addition, or by cutting and pasted other recorded trajectories;

Add and modify the allowed driving envelope;

Select a stored trajectory and an allowed driving envelope, and assign them to a vehicle.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims. Note with respect to the materials of construction, it is not desired nor intended to thereby unnecessarily limit the present invention by reason of such disclosure.

The present disclosure describes a system that is used to record and execute trajectories for autonomous mining and construction applications. It comprises one or more sensors that can detect road features, a drive-by-wire kit installed onto the truck(s), a user interface that allows the operator to learn trajectories and "replay trajectories", and a planning algorithm that creates trajectories which take the vehicle from a starting location to an ending location (final destination), while maintaining the vehicle inside of the allowed driving envelope.

A drive-by-wire kit refers to the complete hardware and software system that allows seamless electronic control of a vehicle's brake, throttle, steering, and shifting to enable testing for autonomous vehicle applications.

In this system, the road features include localization features. The road features also include support surface estimation. Also, the road features include a classification of drivable and non-drivable areas.

In the system described by the present invention, the allowed driving envelope is automatically created by the system using the learned traversable areas. The system also determines its locations using the localization features learned during the learning stage.

The system described in the present invention determines its localization using a combination of inertial information, GPS, infrastructure beacons, and/or localization features.

GPS refers to global positioning system and is a satellite-based navigation system made up of at least 24 satellites. GPS works in any weather conditions, anywhere in the world, 24 hours a day, with no subscription fees or setup charges. The U.S. Department of Defense (USDOD) originally put the satellites into orbit for military use, but they were made available for civilian use in the 1980s. GPS satellites circle the Earth twice a day in a precise orbit. Each satellite transmits a unique signal and orbital parameters that allow GPS devices to decode and compute the precise location of the satellite. GPS receivers use this information and trilateration to calculate a user's exact location. Essentially, the GPS receiver measures the distance to each satellite by the amount of time it takes to receive a transmitted signal. With distance measurements from a few more satellites, the receiver can determine a user's position and display it electronically.

Beacons are small radio transmitters that send out information about their position. Due to cost-effectiveness and reliability, Indoor Positioning and Navigation solutions based on iBeacon technology rank high on the popularity list.

In the system described in the present invention, the operator can enter passing areas and/or predetermined passing routes. Here, the trajectories, features, and envelopes are shared between trucks. The system contains a database that has a number of trajectories stored.

In this system, the operator can choose multiple trajectories, and can concatenate trajectory segments to create a new route that may have never been completely driven as a whole in the learning process.

In the system described in the present invention, the truck doing the initial data collection during the learning process is a different truck than the one executing the trajectories. The system is installed on a road grader, excavator, or other vehicle used in mining or construction operations.

A road grader is a construction machine with a long blade used to create a flat surface during the grading process. An excavator is a heavy construction equipment consisting of a boom, dipper, bucket and cab on a rotating platform known as the "house". The house sits atop an undercarriage with tracks or wheels. They are a natural progression from the steam shovels and often mistakenly called power shovels.

In the system described in the present invention, the traversable areas are updated during the execution stage.

In the system that is described in the present invention, the operator is informed, or the trucks are not allowed to execute if the traversable area infringes upon the allowable driving envelope.

In the system that is described in the present invention, there is an over-the air interface that can synchronize features and trajectories with other vehicles, or with a ground station. The trajectory being followed can be manually edited. In this system, the vehicle size and other physical characteristics are used to determine the traversibility of the space.

The embodiments of the invention in which an exclusive property or privilege is claimed are defined as follows:

1. A system for a mining or construction autonomous truck, the system comprising:
   one or more perception sensors mounted on the autonomous truck and configured to detect road features;
   a drive-by-wire kit installed in the autonomous truck;
   a user interface configured to receive route planning input from one or more operators;
   a database; and
   one or more processing modules operatively coupled to the one or more perception sensors, the drive-by-wire kit, the user interface, and the database,
   wherein the one or more processing modules are configured to:
      receive, via the user interface, first input to initiate a learning phase;
      detect, via at least the one or more perception sensors, a first route of the autonomous truck as the autonomous truck is manually driven from a first location to a second location;
      detect, via the one or more perception sensors, one or more road features along the manually-driven first route, the detecting including detecting color, texture, and shape of the one or more road features along the first route;
      store, in the database, data regarding the detected first route and the detected one or more road features;
      receive, via the user interface, second input to stop the learning phase;
      receive, via the user interface, third input selecting a first route tolerance defining allowable deviations from the first route; and
      control, via the drive-by-wire kit, the autonomous truck to follow, within the selected first route tolerance, the first route from the first location to the second location, and
   wherein the one or more processing modules are configured to control the autonomous truck to follow the first route by:
      re-detecting, via the one or more perception sensors, the one or more road features along the first route, the re-detecting including re-detecting the color, the texture, and the shape of the one or more road features along the first route; and
      determining a location of the autonomous truck based at least in part on the re-detected one or more road features.

2. The system of claim 1, further comprising:
   one or more navigation sensors mounted on the autonomous truck and configured to detect a location of the autonomous truck,
   wherein the one or more processing modules are configured to determine the location of the autonomous truck based on the re-detected road features supplemented by data from the one or more navigation sensors, and
   the one or more navigation sensors comprises a global positioning system (GPS), an inertial measurement unit, a ranging radio, a wheel encoder, or any combination of the foregoing.

3. The system of claim 1, wherein the one or more processing modules are further configured to:
   receive, via the user interface, fourth input selecting a portion of the first route where trucks are allowed to pass in opposite directions.

4. The system of claim 1, further comprising:
   a communication system,
   wherein the one or more processing modules are further configured to send, via the communication system, data to another autonomous truck regarding the first route, the detected road features, the first route tolerance, or any combination of the foregoing.

5. The system of claim 1, wherein the one or more processing modules are further configured to:
   store, in the database, data regarding second route and detected one or more additional road features along the second route, the data being acquired by a vehicle separate from the autonomous truck;
   receive, via the user interface, input to select a first segment from the stored first route stored and a second segment from the stored second route;
   concatenate the selected first and second segments to create a modified route for subsequent control; and control, via the drive-by-wire kit, the autonomous truck to follow the modified route.

6. The system of claim 1, wherein the autonomous truck comprises a dump truck, a road grader, or an excavator.

7. The system of claim 1, wherein the one or more processing modules are further configured to:
determine, after receiving the second input and prior to the control, updated traversable surfaces along the first route.

8. The system of claim 7, wherein the one or more processing modules are further configured to:
pause or prevent control when the selected first route tolerance extends outside the updated traversable surface.

9. The system of claim 7, wherein the one or more processing modules are further configured to:
receive, via the user interface and prior to receiving the third input, input selecting a second route tolerance defining allowable deviations from the first route; and
alert, via the user interface, when the selected second route tolerance infringes on non-traversable surfaces.

10. The system of claim 1, further comprising:
a communication system configured to share data regarding detected road features and routes with other vehicles, or with a ground station.

11. The system of claim 1, wherein the one or more processing modules are further configured to:
receive, via the user interface, fourth input manually editing at least a portion of the first route.

12. The system of claim 1, wherein the one or more processing modules are configured to control the autonomous truck such that the autonomous truck deviates from the first route within the selected first route tolerance to avoid an obstacle or another vehicle along the first route.

13. The system of claim 1, wherein the one or more perception sensors comprises a laser detection and ranging (LADAR) system, a stereo camera, ranging sensor, an imaging camera, or any combination of the foregoing.

14. The system of claim 1, wherein stored data regarding the detected first route includes poses and locations of the autonomous truck.

15. A system for a mining or construction autonomous truck, the system comprising:
one or more perception sensors mounted on the autonomous truck and configured to detect road features;
a drive-by-wire kit installed in the autonomous truck;
a user interface configured to receive route planning input from one or more operators;
a database; and
one or more processing modules operatively coupled to the one or more perception sensors, the drive-by-wire kit, the user interface, and the database,
wherein the one or more processing modules are configured to:
receive, via the user interface, first input to initiate a learning phase;
detect, via at least the one or more perception sensors, a first route of the autonomous truck as the autonomous truck is manually driven;
detect, via the one or more perception sensors, one or more road features along the manually-driven first route;
store, in the database, data regarding the detected first route and the detected one or more road features;
receive, via the user interface, second input to stop the learning phase;
receive, via the user interface, third input to initiate another learning phase;
detect, via at least the one or more perception sensors, a second route of the autonomous truck as the autonomous truck is manually driven;
detect, via the one or more perception sensors, one or more additional road features along the manually-driven second route;
store, in the database, data regarding the detected second route and the detected one or more additional road features;
receive, via the user interface, fourth input to stop the another learning phase;
receive, via the user interface, fifth input to select a first segment from the stored first route and a second segment from the stored second route;
concatenate the selected first and second segments to create a modified route for subsequent control;
receive, via the user interface, sixth input selecting a route tolerance defining allowable deviations from the modified route; and
control, via the drive-by-wire kit, the autonomous truck to follow the modified route within the selected route tolerance.

16. The system of claim 15, wherein the one or more processing modules are further configured to:
classify, based on data from the one or more perception sensors, road portions along the modified route as drivable or non-drivable.

17. The system of claim 15, wherein the one or more processing modules are further configured to:
receive, via the user interface, input selecting a portion of the modified route where trucks are allowed to pass in opposite directions.

18. The system of claim 15, wherein the one or more processing modules are further configured to:
receive, via the user interface, input manually editing at least a portion of the modified route.

19. The system of claim 15, wherein the one or more processing modules are configured to control the autonomous truck such that the autonomous truck deviates from the modified route within the selected first route tolerance to avoid an obstacle or another vehicle along the modified route.

20. A system for a mining or construction autonomous truck, the system comprising:
one or more perception sensors mounted on the autonomous truck and configured to detect road features;
a drive-by-wire kit installed in the autonomous truck;
a user interface configured to receive route planning input from one or more operators;
a database; and
one or more processing modules operatively coupled to the one or more perception sensors, the drive-by-wire kit, the user interface, and the database,
wherein the one or more processing modules are configured to:
receive, via the user interface, first input to initiate a learning phase;
detect, via at least the one or more perception sensors, a first route of the autonomous truck as the autonomous truck is manually driven from a first location to a second location;
detect, via the one or more perception sensors, one or more road features along the manually-driven first route, the detecting including detecting color, texture, or shape of the one or more road features along the first route;

store, in the database, data regarding the detected first route and the detected one or more road features;

receive, via the user interface, second input to stop the learning phase;

receive, via the user interface, third input selecting a first route tolerance defining allowable deviations from the first route; and control, via the drive-by-wire kit, the autonomous truck to follow, within the selected first route tolerance, the first route from the first location to the second location, and wherein the one or more processing modules are configured to control the autonomous truck to follow the first route by:

re-detecting, via the one or more perception sensors, the one or more road features along the first route, the re-detecting including re-detecting the color, the texture, or the shape of the one or more road features along the first route; and determining a location of the autonomous truck based at least in part on the re-detected one or more road features, wherein the one or more processing modules are further configured to classify, based on data from the one or more perception sensors, road portions along the first route as drivable or non-drivable, and wherein the one or more processing modules are configured to classify based at least in part on one or more physical characteristics of the autonomous truck.

* * * * *